United States Patent [19]
Sebben et al.

[11] Patent Number: 5,157,908
[45] Date of Patent: Oct. 27, 1992

[54] MOWER DECK

[75] Inventors: Daniel A. Sebben, West Bend; Wayne R. Hutchison, Mayville; Richard D. Teal, Horicon, all of Wis.; Steven C. Wasson, Midland, Mich.; Luis Lorenzo, Midland, Mich.

[73] Assignee: Deere & Company, Moline, Ill.

[21] Appl. No.: 715,157

[22] Filed: Jun. 14, 1991

[51] Int. Cl.⁵ .................... A01D 34/64; A01D 67/00
[52] U.S. Cl. .................... 56/320.1; 56/255; 56/320.2
[58] Field of Search ............... 56/17.5, 255, 320.1, 56/320.2

[56] References Cited

U.S. PATENT DOCUMENTS

| | | | |
|---|---|---|---|
| 2,329,185 | 9/1943 | Coddington | 56/320.1 |
| 3,008,283 | 11/1961 | Wood, Jr. | 56/17.5 X |
| 3,759,023 | 9/1973 | Comer | 56/320.1 |
| 4,711,077 | 12/1987 | Kutsukake et al. | 56/320.2 |
| 4,724,660 | 2/1988 | Bowie et al. | 56/320.1 X |
| 4,887,420 | 12/1989 | Cerney, Jr. et al. | 56/320.2 |
| 4,889,526 | 2/1990 | Harris | 56/320.2 |
| 4,928,457 | 5/1990 | Laperle | 56/320.1 X |
| 4,944,142 | 7/1990 | Sueshige et al. | 56/320.1 |

Primary Examiner—George A. Suchfield

[57] ABSTRACT

A mower deck within which a blade coupled with a vertical shaft rotates for cutting vegetation. The deck includes a generally horizontal central portion, and side walls downwardly extending from the central portion. The central portion and side walls form a compartment within which the blade rotates to cut vegetation. A vertically extending and generally cylindrical portion is formed integral with the central portion for operatively supporting the vertical shaft for rotation during mowing operation. Two bearings are positioned within the cylindrical portion for rotatably supporting the vertical shaft. A radially inwardly extending portion is formed within the cylindrical portion and is positioned between the bearings for vertically locating the bearings within the cylinder. The inwardly extending portion is formed integral with the cylindrical portion. The radially inwardly extending portion includes a plurality of vertically extending support ribs for vertically locating the bearings within the cylinder.

34 Claims, 3 Drawing Sheets

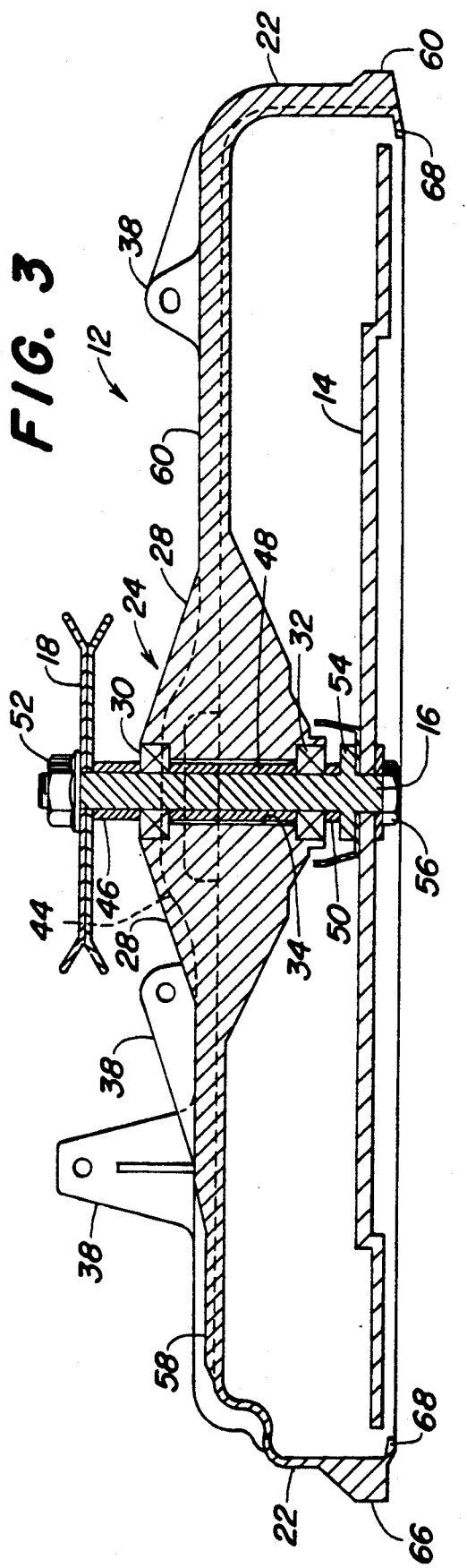

MOWER DECK

BACKGROUND OF THE INVENTION

1. Field of the Invention

The invention relates to mower deck housings and the various mechanisms coupled thereto, such as spindle housings and attachment brackets.

2. Description of the Related Art

Conventional riding mower vehicles are provided with mower decks that house a rotating blade for the cutting of vegetation. Typically, these decks have been made of metal materials. Various structures are attached to the mower deck during operation. Spindle housings have typically been bolted or welded to the mower deck. Spindle housings support a plurality of bearings that receive a vertical spindle or shaft to which the horizontal cutting blade is attached. As the spindle rotates during cutting operation, the spindle housing holds the bearings and spindle in secure vertical position. Attachment brackets are also often bolted or welded to the mower deck. The attachment brackets define structure to which linkages may be coupled to attach the deck to a vehicle. Attachment bracketry are also bolted or welded to the deck for coupling anti-scalp wheels to the deck. Handles have been bolted or welded to conventional decks to provide a location for the operator to grab the mower deck, such as when the deck is removed from the vehicle.

Conventional mower decks therefore include a relatively large number of parts that must be separately formed and assembled during the manufacturing process. The manufacturing process is therefore a relatively time consuming and costly process. Since conventional mower decks couple a plurality of various structures to the deck, the possibility exists for the structures to become loosened after long periods of operation. Loose structure carried by the deck may generate an undesirable amount of noise. The structures may experience excessive stress and break once they become loosened from the deck, and may eventually come uncoupled from the deck. Another disadvantage of conventional mower decks is the cumulative effect of the tolerances of the various parts attached to the deck. The cumulative effect of tolerances and/or the mislocation of the various parts during assembly may cause the mower deck to run noisily, malfunction, or impair the performance of the mower.

Furthermore, conventional metal decks are painted to be visually pleasing and to protect the metal deck from corrosion and rust. The metal decks can become worn and scratched after periods of long use such that the paint is damaged. Once the paint is marred or damaged it no longer protects the metal from rust, and the deck is susceptible to early deterioration and failure.

Therefore, it would be desirable to provide a mower deck having a relatively small number of parts such that the manufacturing and assembly costs are relatively low. It would be desirable to provide a mower deck having a spindle housing and attachment brackets that will not come loose or unattached during operation. Also, it would be desirable to provide a mower deck that reduces the undesirable cumulative effect of tolerances of the various parts being coupled together, and that reduces the possibility of parts being mislocated during the manufacturing process. It would also be desirable to provide a mower deck that is resistant to wear and corrosion.

SUMMARY OF THE INVENTION

The preferred embodiment of the present invention provides a mower deck formed of a plastic material and within which a blade coupled with a vertical shaft rotates for cutting vegetation. The deck includes a generally horizontal central portion, and side walls that extend downwardly from the central portion. The central portion and side walls form a compartment within which the blade rotates to cut vegetation. A vertically extending and generally cylindrical portion is formed integral with the central portion for operatively supporting the vertical shaft for rotation during cutting operation. Reinforcing ribs extend radially outwardly from the cylindrical portion to the central portion for firmly holding the cylindrical portion in vertical position. Two bearings are positioned within the cylindrical portion for rotatably supporting the vertical shaft. A plurality of vertically extending support ribs are formed within the cylindrical portion and are positioned between a pair of the bearings for vertically locating the bearings within the cylinder. Each of said vertically extending support ribs is formed integral with the cylindrical portion and is aligned with a respective radially extending reinforcing rib. Attachment bosses to which linkages may be coupled for attaching the deck to a vehicle are formed integral with the central portion. A handle that can be grasped by an operator is formed integral with the deck.

BRIEF DESCRIPTION OF THE DRAWINGS

FIG. 3 is a sectional view of the deck according to the present invention.

DESCRIPTION OF THE PREFERRED EMBODIMENT

Figure 1:
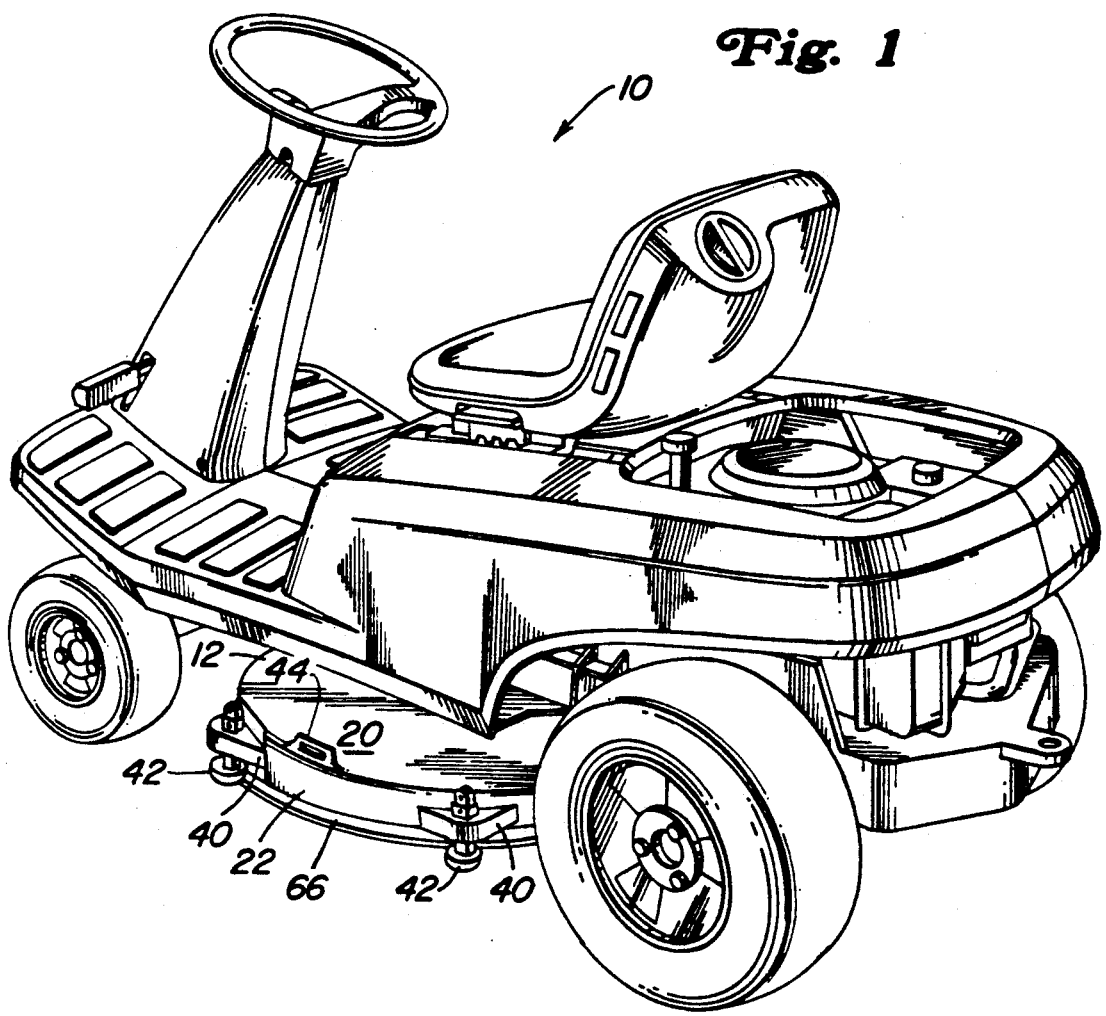
FIG. 1 shows a vehicle having the present invention coupled therewith.
Figure 2:
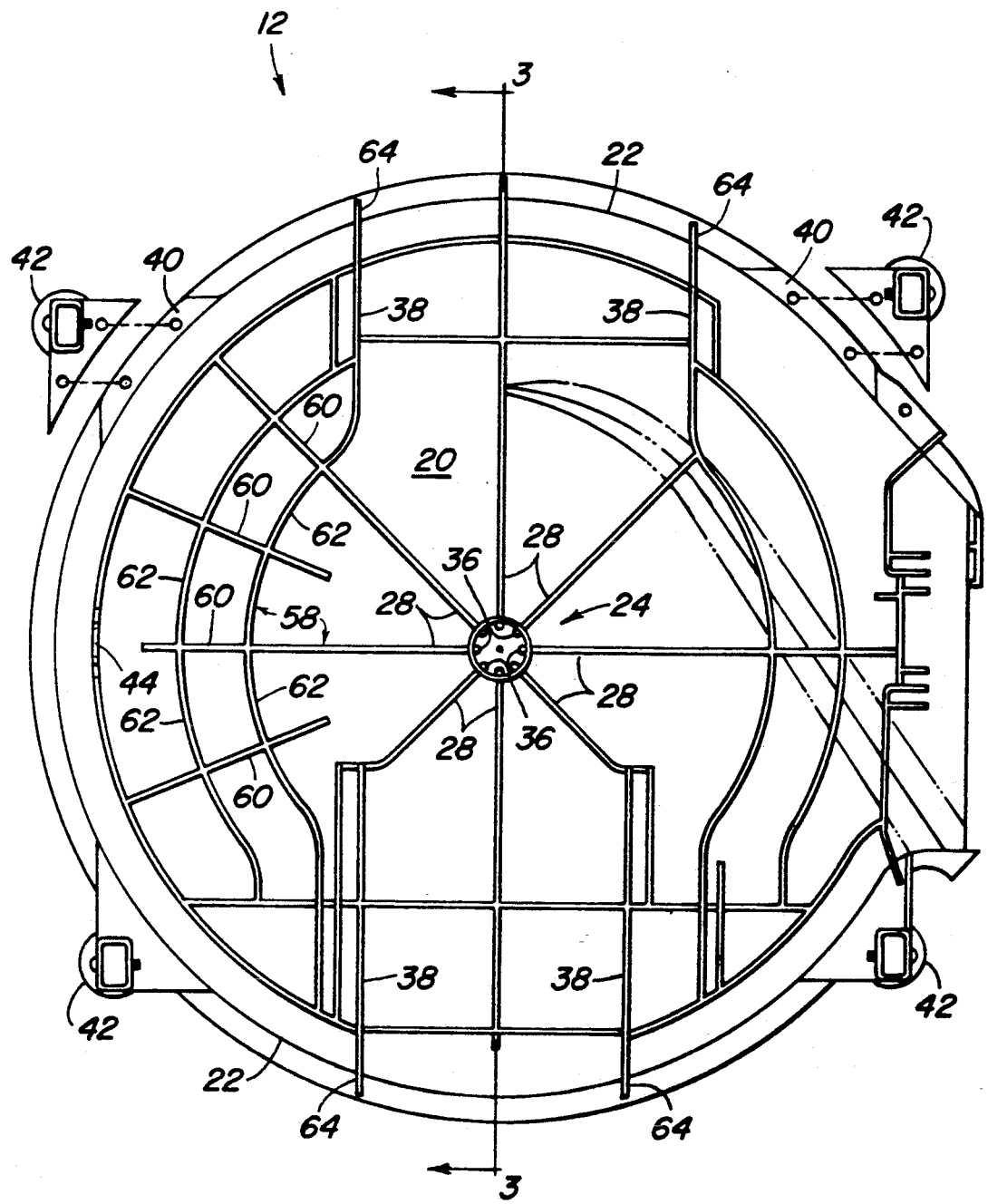
FIG. 2 is a plan view of a deck according to the preferred embodiment of the present invention.

Referring now to FIG. 1, there is shown a lawn vehicle 10 with which the preferred embodiment of the present invention may be used. A mower deck or blade housing 12, shown in detail in FIGS. 2 and 3, is carried beneath the vehicle 10. The mower deck 12, as seen in FIG. 3, houses a cutter blade 14 carried by a vertical shaft or spindle 16. The spindle 16 is fixed for rotation with a pulley 18 that is driven by a belt (not shown). The belt transmits power from the engine or power source of the vehicle 10 to the pulley 18, which in turn acts to rotate the cutter blade 14.

The mower deck 12 is formed of a plastic material according to the preferred embodiment and includes a generally horizontal central portion 20. Side walls 22 extend downwardly from the central portion 20. The central portion 20 and side walls 22 form a compartment within which the blade 14 rotates to cut vegetation during operation. A spindle supporting portion 24 is formed integral with the central portion 20 of the deck 12. A vertically extending and generally cylindrical portion 26 receives the shaft 16 for rotation during operation. A plurality of radially extending reinforcing ribs 28 are provided for supporting the cylinder 26 in vertically upright position. The reinforcing ribs 28 are formed integral with the cylinder 26 and central portion 20 of the deck 12. A pair of bearings 30 and 32 are positioned within the cylindrical portion 26 and rotatably receive the spindle 16. A radially inwardly extending portion 34 is formed within the cylinder 26 for vertically locating the bearings 30 and 32 within the cylinder 26. The inwardly 10 extending portion 34 is formed integral with the cylindrical portion 26 and includes a plurality of vertically extending support ribs 36. Attachment bosses 38 formed integral with the central portion 20 of the deck 12 are adapted to receive rods (not shown) for carrying the deck 12 beneath the vehicle 10 during operation. Attachment bracketry 40 is also formed in the deck 12 for coupling anti-scalp skid shoes 42 to the deck 12. A handle 44 (as best seen in broken lines in FIG. 3) that can be gripped by the hand of the operator is formed integral with the deck 12.

A mechanism is provided for fixing the spindle 16 for rotation with the pulley 18. First, second and third cylindrical spacers 46, 48 and 50 are carried on the spindle 16, and abut the inner races of the bearings 46, 48 and 50. A nut 52 threaded onto the top portion of the spindle 16 places the pulley 18, the spacers 46, 48 and 50, and the inner races of the bearings 30 and 32 in compression against a flange portion 54 of the spindle 16. The friction between the compressed members acts to secure the spindle 16 for rotation with the pulley 16. A nut 56 threaded onto the bottom of the spindle 16 acts to compress the blade 14 upwardly against the flange 54 to secure the blade 14 for rotation with the spindle 16.

The mower deck 12 is provided with a plurality of reinforcing ridges 58 formed integral with the deck 12 for increasing the strength and rigidity of the deck 12. The central portion 20 includes radially extending ridges 60, as well as ridges 62 that extend in an arc about the center of the deck 12. The upstanding attachment bosses 38 include side ridges 64 that extend downwardly along the side walls 22 of the deck 12. A circumferential ridge 66 is also formed in the side wall 22 of the deck 12. Since the thickness of the deck 12 at the ridges 58, 60, 62, 64 and 66 is greater than that of the rest of the deck 12, the ridges act to generally strengthen and rigidify the deck 12.

A conventional inner lip 68 is provided by the preferred embodiment and is formed integral with the lower portion of the side walls.

The vertical cylinder 26 receives the spindle 16 for rotation during operation. The vertically extending support ribs 36 are positioned within the cylinder 26 to fix the vertical position of the bearings 30 and 32. The support ribs 36 extend between the outer races of the two bearings 30 and 32. The weight of the spindle 16, spacers 46, 48 and 50, and blade 14 urges the spindle 16 downwardly within the cylinder 26, and therefore acts to press the top bearing 30 down against the support ribs 36. During operation the spindle 16 may also encounter forces that urge the spindle 16 upwardly within the cylinder 26, and therefore drive the lower bearing 32 upwardly against the support ribs 36. The support ribs 36 block the bearings 30 and spindle 16 thereattached from shifting vertically upwardly or downwardly during operation. A uniform height of cut is therefore provided. The support ribs 36 according to the preferred embodiment do not encounter a large compression load associated with the nut 52 being threaded downwardly onto the spindle 16. The nut 52 acts to compress the pulley 18, the first spacer 46, the inner race of the top bearing 30, the second spacer 48, the lower bearing 32 and the third spacer 50 against the flange portion 54 of the spindle 16. The second spacer 48 is positioned between the two bearings 30 and 32 to receive and transmit the compressive force. The second spacer 48 therefore prevents the support ribs 36 from encountering an excessive amount of compressive load. Since the support ribs 36 receive only relatively small compressive loads, the support ribs 36 can be manufactured from a relatively non-rigid material such as plastic that is inexpensive to manufacture.

A plurality of support ribs 36 are provided by the preferred embodiment rather than a solid mass of material. The amount of material used to form the deck 12 is correspondingly reduced. Since the thickness of the cylinder 26 between the support ribs 36 is less than if a solid mass of material were used, the cooling time required during the molding process is correspondingly reduced. The cycle time required to manufacture each deck is thereby reduced. Also, the plastic material will cool more uniformly during the molding process than if a solid mass of material were used Uniform cooling of the material during the molding process allows the part to be formed with relatively few deformations, and the support ribs 36 and cylinder 26 can therefore be molded relatively precisely. Also, the support ribs 36 are each aligned with a respective radially extending reinforcing rib 28 in order to reduce the amount of deformation during cooling associated with non-uniform part thickness.

The deck 12 according to the present invention is formed from a plastic material such as an engineered thermoplastic or high density polyethylene. The deck 12 may be manufactured by an injection molding process or a compression molding process. The deck 12 can be formed from a plastic material having the desired color included in the material. Therefore, the deck 12 can be molded in color such that a separate painting process is eliminated. Also, since the color is molded in, there is no paint that could chip away over periods of extensive use. The plastic material used may be more resistant to chipping and wear than a metal deck, and will resist corrosion and rust.

Since the deck 12 is a single molded piece that includes attachment bosses 38, a handle 44, and a spindle housing portion 24, the manufacturing processes of separately attaching the various structures to the deck are eliminated. The manufacturing process is therefore relatively short and inexpensive. Also, the cumulative effects of the tolerances of separate parts being coupled together are eliminated. The possibility of parts being mislocated is reduced since the various structures are formed as a single part. The loosening of the various structures from the deck 12 is also thereby eliminated.

The preferred embodiment as described above includes a second spacer 48 positioned between the bearings 30 and 32. However, a plurality of separate spacers may be positioned between the bearings 30 and 32. Also, sleeves may be positioned between each bearing 30 and 32 and the cylinder 26 for absorbing loads transferred therebetween. The sleeves could be easily replaced if damaged by high loadings.

I claim:

1. A mower deck within which a blade coupled with a vertical shaft rotates for cutting vegetation, said deck comprising:

a generally horizontal central portion, side walls downwardly extending from the central portion, said central portion and side walls forming a compartment within which the blade rotates to cut vegetation, a vertically extending and generally cylindrical portion formed integral with the central portion for operatively vertically supporting the vertical shaft for rotation during mowing operation.

2. The invention of claim 1, wherein the deck is formed of a plastic material.

3. The invention of claim 1, and further comprising:
at least two bearings positioned within the cylindrical portion for rotatably supporting the vertical shaft, said shaft being vertically fixed within the bearings, a radially inwardly extending portion formed within the cylindrical portion and positioned between a pair of the bearings for vertically locating the bearings within the cylindrical portion, said inwardly extending portion being formed integral with the cylindrical portion.

4. The invention of claim 3, wherein the radially inwardly extending portion further comprises a plurality of vertically extending support ribs for vertically locating the bearings within the cylindrical portion.

5. The invention of claim 1, and further comprising reinforcing ribs extending radially outwardly from the cylindrical portion to the central portion for firmly holding the cylindrical portion in vertical position.

6. The invention of claim 5, and further comprising:
at least two bearings positioned within the cylindrical portion for rotatably supporting the vertical shaft, said shaft being vertically fixed within the bearings, a plurality of vertically extending support ribs formed within the cylindrical portion and positioned between a pair of the bearings for vertically locating the bearings within the cylindrical portion, each of said vertically extending support ribs being formed integral with the cylindrical portion and in alignment with a respective radially extending reinforcing ribs.

7. The invention of claim 1 and further comprising attachment bosses formed integral with the central portion and to which linkages may be coupled to attach the deck to a vehicle.

8. The invention of claim 1, wherein a handle that can be grasped by an operator is formed integral with the deck.

9. The invention of claim 1, wherein an inner lip is formed integral with the side walls.

10. The invention of claim 1, wherein the cylindrical portion operatively supports a bearing which receives and vertically supports the vertical shaft for rotation during mowing operation.

11. The invention of claim 10, wherein the deck is formed of a plastic material.

12. The invention of claim 10, and further comprising:
at least two bearings positioned within the cylindrical portion for rotatably supporting the vertical shaft, said shaft being vertically fixed within the bearings, a radially inwardly extending portion formed within the cylindrical portion and positioned between a pair of the bearings for vertically locating the bearings within the cylindrical portion, said inwardly extending portion being formed integral with the cylindrical portion.

13. The invention of claim 12, wherein the radially inwardly extending portion further comprises a plurality of vertically extending support ribs for vertically locating the bearings within the cylindrical portion.

14. The invention of claim 10, and further comprising reinforcing ribs extending radially outwardly from the cylindrical portion to the central portion for firmly holding the cylindrical portion in vertical position.

15. The invention of claim 14, and further comprising:
at least two bearings positioned within the cylindrical portion for rotatably supporting the vertical shaft, said shaft being vertically fixed within the bearings, a plurality of vertically extending support ribs formed within the cylindrical portion and positioned between a pair of the bearings for vertically locating the bearings within the cylindrical portion, each of said vertically extending support ribs being formed integral with the cylindrical portion and in alignment with a respective radially extending reinforcing ribs.

16. The invention of claim 10 and further comprising attachment bosses formed integral with the central portion and to which linkages may be coupled to attach the deck to a vehicle.

17. The invention of claim 10, wherein a handle that can be grasped by an operator is formed integral with the deck.

18. The invention of claim 10, wherein an inner lip is formed integral with the side walls.

19. A mower deck within which a blade coupled with a vertical shaft rotates for cutting vegetation, said deck comprising:
a generally horizontal central portion,
side walls downwardly extending from the central portion, said central portion and side walls forming a compartment within which the blade rotates to cut vegetation,
a vertically extending and generally cylindrical portion formed integral with the central portion for operatively supporting the vertical shaft for rotation during mowing operation,
said deck being formed of a plastic material,
at least two bearings positioned within the cylindrical portion for rotatably supporting the vertical shaft, said shaft being vertically fixed within the bearings, and
a radially inwardly extending portion formed within the cylindrical portion and positioned between a pair of the bearings for vertically locating the bearings within the cylindrical portion, said inwardly extending portion being formed integral with the cylindrical portion.

20. The invention of claim 19, wherein the radially inwardly extending portion further comprises a plurality of vertically extending support ribs for vertically locating the bearings within the cylindrical portion.

21. The invention of claim 20, wherein the radially inwardly extending portion further comprises a plurality of vertically extending support ribs formed within the cylindrical portion and positioned between a pair of the bearings for vertically locating the bearings within the cylindrical portion, each of said vertically extending support ribs being formed integral with the cylindrical portion and in alignment with a respective radially extending reinforcing ribs.

22. The invention of claim 19 and further comprising reinforcing ribs extending radially outwardly from the cylindrical portion to the central portion for firmly holding the cylindrical portion in vertical position.

23. The invention of claim 19 and further comprising attachment bosses formed integral with the central portion and to which linkages may be coupled to attach the deck to a vehicle.

24. The invention of claim 19, wherein a handle that can be grasped by an operator is formed integral with the deck.

25. The invention of claim 19, wherein an inner lip is formed integral with the side walls.

26. A mower deck within which a blade coupled with a vertical shaft rotates for cutting vegetation, said deck comprising:
   a generally horizontal central portion,
   side walls downwardly extending from the central portion, said central portion and side walls forming a compartment within which the blade rotates to cut vegetation,
   a vertically extending and generally cylindrical portion formed integral with the central portion for operatively supporting the vertical shaft for rotation during cutting operation,
   reinforcing ribs extending radially outwardly from the cylindrical portion to the central portion for firmly holding the cylindrical portion in vertical position,
   at least two bearings positioned within the cylindrical portion for rotatably supporting the vertical shaft, said shaft being vertically fixed within the bearings, and
   a plurality of vertically extending support ribs formed within the cylindrical portion and positioned between a pair of the bearings for vertically locating the bearings within the cylindrical portion, each of said vertically extending support ribs being formed integral with the cylindrical portion and in alignment with a respective radially extending reinforcing ribs.

27. The invention of claim 26 and further comprising attachment bosses formed integral with the central portion and to which linkages may be coupled to attach the deck to a vehicle.

28. The invention of claim 26, wherein a handle that can be grasped by an operator is formed integral with the deck.

29. The invention of claim 26, wherein an inner lip is formed integral with the side walls.

30. A mower deck within which a blade coupled with a vertical shaft rotates for cutting vegetation, said deck comprising:
   a generally horizontal central portion,
   side walls downwardly extending from the central portion, said central portion and side walls forming a compartment within which the blade rotates to cut vegetation,
   a vertically extending and generally cylindrical portion formed integral with the central portion for operatively supporting the vertical shaft for rotation during cutting operation
   at least two bearings positioned within the cylindrical portion for rotatably supporting the vertical shaft, said shaft being vertically fixed within the bearings, and
   a radially inwardly extending portion formed within the cylindrical portion and positioned between a pair of the bearings for vertically locating the bearings within the cylindrical portion, said inwardly extending portion being formed integral with the cylindrical portion.

31. A mower deck within which a blade coupled with a vertical shaft rotates for cutting vegetation, said deck comprising:
   a generally horizontal central portion,
   side walls downwardly extending from the central portion, said central portion and side walls forming a compartment within which the blade rotates to cut vegetation,
   a vertically extending and generally cylindrical portion formed integral with the central portion for operatively supporting the vertical shaft for rotation during cutting operation,
   at least two bearings positioned within the cylindrical portion for rotatably supporting the vertical shaft, said shaft being vertically fixed within the bearings, and
   a radially inwardly extending portion formed within the cylindrical portion and positioned between a pair of the bearings for vertically locating the bearings within the cylindrical portion, said inwardly extending portion being formed integral with the cylindrical portion, said radially inwardly extending portion further including a plurality of vertically extending support ribs for vertically locating the bearings within the cylindrical portion.

32. A mower deck within which a blade coupled with a vertical shaft rotates for cutting vegetation, said deck comprising:
   a generally horizontal central portion,
   side walls downwardly extending from the central portion, said central portion and side walls forming a compartment within which the blade rotates to cut vegetation,
   a vertically extending and generally cylindrical portion formed integral with the central portion for operatively supporting the vertical shaft for rotation during cutting operation, and
   reinforcing ribs extending radially outwardly from the cylindrical portion to the central portion for firmly holding the cylindrical portion in vertical position.

33. A mower deck within which a blade coupled with a vertical shaft rotates for cutting vegetation, said deck comprising:
   a generally horizontal central portion,
   side walls downwardly extending from the central portion, said central portion and side walls forming a compartment within which the blade rotates to cut vegetation,
   a vertically extending and generally cylindrical portion formed integral with the central portion for operatively supporting the vertical shaft for rotation during cutting operation, and
   reinforcing ribs extending radially outwardly from the cylindrical portion to the central portion for firmly holding the cylindrical portion in vertical position,
   at least two bearings positioned within the cylindrical portion for rotatably supporting the vertical shaft, said shaft being vertically fixed within the bearings, and
   a plurality of vertically extending support ribs formed within the cylindrical portion and positioned between a pair of the bearings for vertically locating the bearings within the cylindrical portion, each of said vertically extending support ribs being formed integral with the cylindrical portion and in alignment with a respective radially extending reinforcing ribs.

34. A mower deck within which a blade coupled with a vertical shaft rotates for cutting vegetation, said deck comprising:

a generally horizontal central portion,
side walls downwardly extending from the central portion, said central portion and side walls forming a compartment within which the blade rotates to cut vegetation,
a vertically extending and generally cylindrical portion formed integral with the central portion for operatively supporting the vertical shaft for rotation during cutting operation, and
an inner lip formed integral with the side walls.

* * * * *